(12) United States Patent
Kim et al.

(10) Patent No.: US 12,209,197 B2
(45) Date of Patent: Jan. 28, 2025

(54) BLACK PAINT COMPOSITION

(71) Applicants: HYUNDAI MOTOR COMPANY, Seoul (KR); KIA CORPORATION, Seoul (KR)

(72) Inventors: Hwan Oh Kim, Incheon (KR); Jae Cheol Jeon, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 844 days.

(21) Appl. No.: 17/349,354

(22) Filed: Jun. 16, 2021

(65) Prior Publication Data

US 2022/0073779 A1    Mar. 10, 2022

(30) Foreign Application Priority Data

Sep. 4, 2020    (KR) .......................... 10-2020-0112944

(51) Int. Cl.
| | | |
|---|---|---|
| C09D 133/08 | (2006.01) |
| C09D 7/20 | (2018.01) |
| C09D 7/45 | (2018.01) |
| C09D 17/00 | (2006.01) |

(52) U.S. Cl.
CPC .............. *C09D 133/08* (2013.01); *C09D 7/20* (2018.01); *C09D 7/45* (2018.01); *C09D 17/005* (2013.01)

(58) Field of Classification Search
CPC .......... C09D 133/08; C09D 7/20; C09D 7/45; C09D 17/005
USPC ........................................................ 524/353
See application file for complete search history.

(56) References Cited

U.S. PATENT DOCUMENTS

2010/0323211 A1*   12/2010   Yukawa ............... C09D 167/02
427/407.1

FOREIGN PATENT DOCUMENTS

| KR | 101260492 B1 * | 5/2013 |
| KR | 10-2017-0024834 A | 3/2017 |
| KR | 20170125213 A * | 11/2017 |
| KR | 101816398 B1 | 1/2018 |

* cited by examiner

*Primary Examiner* — Kelechi C Egwim
(74) *Attorney, Agent, or Firm* — Morgan, Lewis & Bockius LLP

(57) ABSTRACT

Disclosed herein is a black paint composition with improved blackness by controlling a black paint and an additive.

9 Claims, No Drawings

BLACK PAINT COMPOSITION

CROSS-REFERENCE TO RELATED APPLICATION

The present application claims priority to Korean Patent Application No. 10-2020-0112944 filed on Sep. 4, 2020, the entire contents of which is incorporated herein for all purposes by this reference.

BACKGROUND OF THE INVENTION

Field of the Invention

The present invention relates to a black paint composition. More particularly, the present invention relates to a black paint composition with improved blackness by controlling a black paint and an additive.

Description of Related Art

A conventional black paint is composed of a resin constituting a physical property of a coating film and a black pigment exhibiting a black color. The most common and representative pigment exhibiting a black color is carbon black (and, which) is applied to a base resin, thereby implementing/producing a black color on the coating film.

Generally, when a content of a black pigment is increased, blackness is improved, but since the black pigment affects physical properties of the coating film, such as interlayer adhesion and the like, there is a limit in improving blackness by simply increasing the content of the black pigment.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of improving blackness of a paint without increasing a content of a black pigment.

Objectives of the present invention are not limited to the above-described objectives, and other objectives of the present invention, which are not mentioned, can be understood by the following description and also will be apparently understood through embodiments of the present invention. Furthermore, the objectives of the present invention can be implemented by means described in the appended claims and a combination thereof.

Various aspects of the present invention provide a black paint composition including a base resin including an acrylic resin and a melamine resin, a black pigment, an additive, and a solvent, wherein the black pigment has a particle size of 80 nm or less.

The acrylic resin may include one selected from the group consisting of methyl acrylate, ethyl acrylate, and a combination thereof.

The black pigment may include one selected from the group consisting of carbon black, titanium black, acetylene black, aniline black, perylene black, and a combination thereof.

A particle size of the black pigment may range from 50 nm to 70 nm.

The additive may include one selected from the group consisting of a dispersion stabilizer, a surface modifier, an anti-settling agent, a flow inhibitor, and a combination thereof.

The dispersion stabilizer may include a polycarboxylic acid modified product, the surface modifier may include silicone-modified acryl, the anti-settling agent may include a benzophenol derivative, and the flow inhibitor may include at least one of an acrylic derivative and modified urethane.

The solvent may include glycol, alcohol, and deionized water.

The glycol may include one selected from the group consisting of ethylene glycol, propylene glycol, and a combination thereof; and the alcohol may include one selected from the group consisting of methanol, ethanol, butanol, and a combination thereof.

The black paint composition may include 35% to 50% by weight of the base resin, 1.0% to 2.0% by weight of the black pigment, 8.5% to 16% by weight of the additive, and 32% to 49% by weight of the solvent based on a total weight of the black paint composition.

The black paint composition may include 30% to 40% by weight of the acrylic resin, 5% to 10% by weight of the melamine resin, 1.0% to 2.0% by weight of the black pigment, 0.5% to 1.0% by weight of a dispersion stabilizer, 2.0% to 4.0% by weight of a surface modifier, 2.0% to 5.0% by weight of an anti-settling agent, 4.0% to 6.0% by weight of a flow inhibitor, and 32% to 49% by weight of the solvent based on a total weight of the black paint composition.

Blackness of the above black paint composition may be 200 or more, adhesion thereof may be 2.0 or less, water-resistant adhesion thereof may be 2.0 or less, and accelerated weather resistance thereof may be 2.0 or less.

Other aspects and exemplary embodiments of the present invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

DETAILED DESCRIPTION

Reference will now be made in detail to various embodiments of the present invention(s), examples of which are illustrated in the accompanying drawings and described below. While the present invention(s) will be described in conjunction with exemplary embodiments, it will be understood that the present description is not intended to limit the present invention(s) to those exemplary embodiments. On the contrary, the present invention(s) is/are intended to cover not only the exemplary embodiments, but also various alternatives, modifications, equivalents and other embodiments, which may be included within the spirit and scope of the present invention as defined by the appended claims.

The above and other objectives, features, and advantages of the present invention will become more apparent from the following description of exemplary embodiments with reference to the accompanying drawings. However, the present invention is not limited to the embodiments disclosed herein and may be implemented in other forms. The embodiments disclosed herein will be provided to make this disclosure thorough and complete, and fully convey the spirit of the present invention to those skilled in the art.

In the present specification, it should be understood that the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof. Furthermore, when a portion of a layer, a film, a region, a plate, or the like is referred to as being "on" other portion, this includes not only a case in which the portion is "directly on" the other portion but also a case in which another portion is present between the portion and the other portion. Contrarily, when a portion of a layer, a film, a region, a plate, or the like is referred to as being "under" other portion, this includes not only a case in which the portion is "directly under" the other portion but also a case in which another portion is present between the portion and the other portion.

Unless otherwise specified, all numbers, values, and/or expressions indicating ingredients, reaction conditions, polymer compositions, and quantities of combination products used herein are approximations to which various uncertainties of measurement are reflected, wherein the various uncertainties occur in obtaining these values among essentially different other things so that it should be understood that all numbers, values, and/or expressions are modified by a term "about". In addition, when a numerical range is disclosed herein, such a numerical range is continuous and, unless otherwise indicated, the numerical range includes all values from a minimum value to a maximum value. Furthermore, when the numerical range refers to integers, unless otherwise indicated, all integers from a minimum value to a maximum value are included.

In this disclosure, when a range is described for a variable, it will be understood that the variable includes all values within the range including endpoints described in the range. For example, it will be understood that a range from "5 to 10" includes values of 5, 6, 7, 8, 9, and 10 as well as any subranges such as ranges from 6 to 10, from 7 to 10, from 6 to 9, from 7 to 9, and the like, and also includes any values between integers, which are reasonable in the scope of ranges, such as 5.5, 6.5, 7.5, 5.5 to 8.5, and 6.5 to 9, and the like. In addition, for example, it will be understood that a range from "10% to 30%" includes all integers including values 10%, 11%, 12%, 13%, and the like and up to 30% as well as arbitrary subranges from 10% to 15%, from 12% to 18, from 20% to 30%, and the like, and also includes any values between integers, which are reasonable in the scope of ranges, such as 10.5%, 15.5%, 25.5%, and the like.

The present invention relates to a black paint composition, and the black paint composition of the present invention includes a base resin, a black pigment, an additive, and a solvent.

Hereinafter, each component of the black paint composition of the present invention will be described.

Base Resin

The base resin of the present invention preferably includes an acrylic resin and a melamine resin.

The acrylic resin has an effect of improving adhesion of a paint, and the melamine resin has an effect of improving curability of the paint.

The acrylic resin includes one selected from the group consisting of methyl acrylate, ethyl acrylate, and a combination thereof. That is, the acrylic resin may be obtained by polymerizing acrylic monomers such as methyl acrylate, ethyl acrylate, and propyl acrylate.

The base resin is contained in the range of 35% to 50% by weight based on the black paint composition of the present invention. More specifically, the acrylic resin is contained in the range of 35% to 40% by weight based on the black paint composition. In this case, when the acrylic resin is less than 35% by weight, adhesion of the paint may be degraded, and when the acrylic resin exceeds 50% by weight, workability using the paint may be degraded.

The melamine resin is contained in the range of 5% to 10% by weight based on the black paint composition. In this case, when the melamine resin is less than 5% by weight, reactivity is decreased so that hardness of a coating film may be degraded, and when the melamine resin exceeds 10% by weight, sanding workability may be degraded due to overcuring.

Black Pigment

The black pigment of the present invention includes one selected from the group consisting of carbon black, titanium black, acetylene black, aniline black, perylene black, and a combination thereof.

A particle size of the black pigment is less than or equal to 80 nm, preferably, ranges from 50 nm to 70 nm.

The black pigment is included in the range of 1.0% to 2.0% by weight based on the black paint composition of the present invention. In this case, when the black pigment is less than 1.0% by weight, it is difficult to implement a required black color, and when the black pigment exceeds 2.0% by weight, interlayer adhesion between the coating films may be affected.

Additive

The additive of the present invention includes one selected from the group consisting of a dispersion stabilizer, a surface modifier, an anti-settling agent, a flow inhibitor, and a combination thereof and, preferably, includes all of the dispersion stabilizer, the surface modifier, the anti-settling agent, and the flow inhibitor.

The additive is contained in the range of 8.5% to 16% by weight based on a total weight of the black paint composition.

The dispersion stabilizer is used for the purpose of preventing aggregation between pigments and, preferably, includes a polycarboxylic acid modified product.

The dispersion stabilizer is included in the range of 0.5% to 1.0% by weight based on the total weight of the black paint composition. In this case, when the dispersion stabilizer is less than 0.5% by weight, blackness may be degraded due to occurrence of a large amount of aggregation between pigments, and when the dispersion stabilizer exceeds 1.0% by weight, a problem may occur in interlayer adhesion between the coating films.

The surface modifier is used for the purpose of improving smoothness of the paint and, preferably, includes silicone-modified acryl.

The surface modifier is included in the range of 2.0% to 4.0% by weight based on the total weight of the black paint composition. In this case, when the surface modifier is less than 2.0 by weight, smoothness of the paint may be degraded, and when the surface modifier exceeds 4.0 by weight, concealment may be degraded.

The anti-settling agent is added for the purpose of preventing pigment precipitation during storage of the paint and, preferably, includes a benzophenol derivative.

The anti-settling agent is included in in the range of 2.0% to 5.0% by weight based on the total weight of the black paint composition. In this case, when a content of the anti-settling agent is less than 2.0% by weight, a precipitation rate of the pigment may be increased, and when the content of the anti-settling agent exceeds 5.0% by weight, appearance quality may be degraded.

The flow inhibitor is used for the purpose of preventing a flow-down by controlling viscosity of the paint and, preferably, includes an acrylic derivative.

The flow inhibitor is included in the range of 4.0% to 6.0% by weight based on the total weight of the black paint composition. In this case, when a content of the flow inhibitor is less than 4.0% by weight, sagging performance of the paint may be degraded, and when the content of the flow inhibitor exceeds 6.0% by weight, smoothness of the paint may be degraded.

Solvent

The solvent of the present invention is used for the purpose of improving workability of painting and includes glycol, alcohol, and deionized water.

The glycol includes one selected from the group consisting of ethylene glycol, propylene glycol, and a combination thereof, and the alcohol includes one selected from the group consisting of methanol, ethanol, butanol, and a combination thereof.

The solvent is contained in the range of 32% to 49% by weight based on the total weight of the black paint composition. In this case, when the solvent is less than 32% by weight, painting work efficiency may be decreased due to an increase in viscosity of the paint, and when the solvent exceeds 49% by weight, painting workability may be decreased due to a decrease in viscosity.

The paint composition of the present invention is characterized by having blackness of 200 or more, adhesion of 2.0 or less, water-resistant adhesion of 2.0 or less, and accelerated weather resistance of 2.0 or less.

Hereinafter, the present invention will be described in more detail with reference to specific examples. However, these examples are for illustrative purposes only, and the scope of the present invention is not limited thereto.

Example 1 and Comparative Examples 1 to 4

Paint compositions were prepared as shown in Table 1 below.

TABLE 1

| | Components | Example 1 | Comparative Example 1 | Comparative Example 2 | Comparative Example 3 | Comparative Example 4 |
|---|---|---|---|---|---|---|
| Base Resin | Acrylic resin | 35.9 | 36.2 | 35.4 | 36.3 | 35.7 |
| | Melamine resin | 7.5 | 7.6 | 7.2 | 7.6 | 7.4 |
| Black Pigment | Carbon black (particle size: 150 nm) | 0.0 | 1.3 | 3.5 | 0.0 | 0.0 |
| | Carbon black (particle size: 60 nm) | 1.2 | 0.0 | 0.0 | 1.2 | 2.5 |
| Additive | Dispersion stabilizer (polycarboxylic acid modified product) | 0.7 | 0.0 | 0.7 | 0.0 | 1.3 |
| | Surface modifier (silicone-modified acrylic) | 3.2 | 3.2 | 3.2 | 3.2 | 3.2 |
| | Anti-settling agent (benzophenol derivative) | 3.9 | 3.9 | 3.9 | 3.9 | 3.9 |
| | Flow inhibitor (acrylic derivative) | 5.0 | 5.0 | 4.8 | 5.0 | 5.0 |
| Solvent | Glycol | 3.3 | 3.3 | 3.3 | 3.3 | 3.3 |
| | Alcohol | 8.1 | 8.1 | 8.1 | 8.1 | 8.1 |
| | Deionized water | 31.2 | 31.4 | 29.9 | 31.4 | 29.7 |

Experimental Example

Blackness, adhesion, water-resistant adhesion, and accelerated weather resistance were measured with respect to the paint compositions of Example 1 and Comparative Examples 1 to 4 and were shown in Table 2.

TABLE 2

| Components | Required standard | Example 1 | Comparative Example 1 | Comparative Example 2 | Comparative Example 3 | Comparative Example 4 |
|---|---|---|---|---|---|---|
| Blackness (Mf) | 200 or more | 210 | 185 | 194 | 191 | 232 |
| State adhesion | M-2.5 or more | M-1.0 | M-1.0 | M-3.0 | M-1.0 | M-2.0 |
| Water-resistant adhesion | After water-resistance (40° C. × 240 Hr), M-2.5 or more | M-1.0 | M-1.0 | M-5.0 | M-1.5 | M-4.0 |
| Accelerated weather resistance | After W-O-M 1000 hr, adhesion is M-2.5 or more and a color difference is ΔE 3 or less | M-1.0 ΔE 0.5 | M-1.0 ΔE 0.8 | M-5.0 ΔE 1.5 | M-1.5 ΔE 1.2 | M-4.5 ΔE 1.3 |

(Blackness measurement)

L*, b*, and a* values are derived using Bykmac equipment of BYK Co.

Blackness (Mf) = 100X[2-log(L* + b * − a*)] on the basis of DIN6174.

Referring to Table 2, it can be confirmed that Comparative Example 1 used a carbon black pigment having a large particle size and thus has low blackness as compared to Example 1. In addition, it can be confirmed that, in Comparative Example 2, the content of the pigment was increased so that the blackness was slightly increased, but the adhesion was poor due to the increment in content of the pigment when compared to Comparative Example 1. In Comparative Example 3, the carbon black pigment having a small particle size was used, but the dispersion stabilizer was not used so that it can be seen that agglomeration between some particles occurred and thus blackness improvement was insignificant. In Comparative Example 4, it can be confirmed that the blackness is most excellent but, since the contents of the carbon black pigment having a small particle size and the dispersion stabilizer are high, adhesion was degraded.

In accordance with various aspects of the present invention, a method of improving blackness of a paint without increasing a content of a black pigment can be provided.

The effects of the present invention are not limited to the above-described effects. It should be understood that the effects of the present invention include all effects which can be inferred from the above description.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A black paint composition, comprising:
a base resin including an acrylic resin and a melamine resin;
a black pigment;
an additive; and
a solvent,
wherein the black pigment has a particle size of 80 nm or less, and
wherein the black paint composition includes 30% to 40% by weight of the acrylic resin, 5% to 10% by weight of the melamine resin, 1.0% to 2.0% by weight of the black pigment, 0.5% to 1.0% by weight of a dispersion stabilizer, 2.0% to 4.0% by weight of a surface modifier 2.0% to 5.0% by weight of an anti-settling agent, 4.0% to 6.0% by weight of a flow inhibitor, and 32% to 49% by weight of the solvent, based on a total weight of the black paint composition.

2. The black paint composition of claim 1, wherein the acrylic resin includes one selected from the group consisting of methyl acrylate, ethyl acrylate, and a combination thereof.

3. The black paint composition of claim 1, wherein the black pigment includes one selected from the group consisting of carbon black, titanium black, acetylene black, aniline black, perylene black, and a combination thereof.

4. The black paint composition of claim 1, wherein the black pigment has the particle size ranging from 50 nm to 70 nm.

5. The black paint composition of claim 1, wherein the additive includes one selected from the group consisting of a dispersion stabilizer, a surface modifier, an anti-settling agent, a flow inhibitor, and a combination thereof.

6. The black paint composition of claim 5, wherein
the dispersion stabilizer includes a polycarboxylic acid modified product;
the surface modifier includes silicone-modified acryl;
the anti-settling agent includes a benzophenol derivative; and
the flow inhibitor includes at least one of an acrylic derivative and modified urethane.

7. The black paint composition of claim 1, wherein the solvent includes glycol, alcohol, and deionized water.

8. The black paint composition of claim 7,
wherein the glycol includes one selected from the group consisting of ethylene glycol, propylene glycol, and a combination thereof; and
wherein the alcohol includes one selected from the group consisting of methanol, ethanol, butanol, and a combination thereof.

9. The black paint composition of claim 1, wherein blackness of the black paint composition is 200 or more,
wherein the blackness is calculated by applying the $L^*$, $a^*$, and $b^*$ values of the CIE color space measured based on DIN6174 to the following equation: Blackness=$100\times[2-\log(L^*+b^*-a^*)]$.

* * * * *